US012723198B1

(12) United States Patent
Wodwaski

(10) Patent No.: US 12,723,198 B1
(45) Date of Patent: Sep. 1, 2026

(54) INERT THERMAL DECOMPOSITION METHODS AND SYSTEMS

(71) Applicant: Carbon Recovery Innovations LLC, Providence Forge, VA (US)

(72) Inventor: Patrick J. Wodwaski, Providence Forge, VA (US)

(73) Assignee: CARBON RECOVERY INNOVATIONS LLC, Providence Forge, VA (US)

(*) Notice: Subject to any disclaimer, the term of this patent is extended or adjusted under 35 U.S.C. 154(b) by 117 days.

(21) Appl. No.: 18/950,707

(22) Filed: Nov. 18, 2024

(51) Int. Cl.

| | |
|---|---|
| ***C10B 1/02*** | (2006.01) |
| ***B01J 6/00*** | (2006.01) |
| ***C09C 1/48*** | (2006.01) |
| ***C10B 7/14*** | (2006.01) |
| ***C10B 47/46*** | (2006.01) |
| ***C10B 49/02*** | (2006.01) |

(Continued)

(52) U.S. Cl.
CPC ............... *C10B 53/00* (2013.01); *B01J 6/008* (2013.01); *C09C 1/48* (2013.01); *C10B 1/02* (2013.01); *C10B 7/14* (2013.01); *C10B 47/46* (2013.01); *C10B 49/02* (2013.01); *C10B 53/02* (2013.01); *C10B 53/07* (2013.01); *C10J 3/10* (2013.01); *C10J 2200/152* (2013.01)

(58) Field of Classification Search
CPC ......... C10B 49/00; C10B 49/02; C10B 47/02; C10B 47/12; C10B 47/46; C10B 7/14; B09B 3/40
See application file for complete search history.

(56) References Cited

U.S. PATENT DOCUMENTS 3,565,808 A * 2/1971 Tertipis ................. C01B 32/942 208/126
4,401,513 A * 8/1983 Brewer ................... C10B 47/46 202/137

(Continued)

OTHER PUBLICATIONS

Jing Wang, Yue Ma, Shuyuan Li, Changtao Yue, "Study of HDPE plastic pyrolysis characteristics using high pressure autoclave", Journal of the Energy Institute, vol. 108, 2023, 101244, ISSN 1743-9671, https://doi.org/10.1016/j.joei.2023.101244.*

(Continued)

*Primary Examiner* — Jonathan Luke Pilcher
(74) *Attorney, Agent, or Firm* — Peter J. Van Bergen

(57) ABSTRACT

Inert decomposition methods and systems are provided. A container is positioned in a containment environment filled with a first oxygen-free inert gas at a positive pressure in excess of ambient pressure surrounding the containment environment. The container has two ports and is partially filled with a material to be decomposed with the two ports disposed above the material to define a free volume. A second oxygen-free inert gas is circulated through the free volume via the two ports to remove moisture from the material wherein the second oxygen-free inert gas fills the free volume. The container with the second oxygen-free inert gas therein is heated to cause the material to undergo pyrolysis wherein the material decomposes into gases, liquids, and solids. During pyrolysis heating, the gases are removed via the two ports. The container is then cooled to reduce temperatures of the liquids and solids below flash-point temperatures thereof.

14 Claims, 5 Drawing Sheets

(51) Int. Cl.

| | |
|---|---|
| ***C10B 53/00*** | (2006.01) |
| ***C10B 53/02*** | (2006.01) |
| ***C10B 53/07*** | (2006.01) |
| ***C10J 3/10*** | (2006.01) |

(56) References Cited

U.S. PATENT DOCUMENTS

| | | | | |
|---|---|---|---|---|
| 4,402,791 | A * | 9/1983 | Brewer | C10B 53/07 202/137 |
| 4,863,702 | A * | 9/1989 | Galloway | B01D 53/00 422/204 |
| 5,678,496 | A * | 10/1997 | Buizza | C10B 53/00 110/255 |
| 5,725,738 | A * | 3/1998 | Brioni | C10B 7/14 201/14 |
| 6,701,855 | B2 | 3/2004 | Barba | |
| 7,373,903 | B2 * | 5/2008 | Kojima | A61L 11/00 110/235 |
| 7,604,791 | B2 * | 10/2009 | Sato | B09B 3/40 585/242 |
| 12,146,108 | B2 * | 11/2024 | Crespo Araoz | C08J 11/12 |
| 2014/0120026 | A1 * | 5/2014 | Itazu | C10B 57/12 422/187 |
| 2022/0145185 | A1 * | 5/2022 | Ito | B09B 3/45 |
| 2022/0161302 | A1 * | 5/2022 | Ito | B09B 3/00 |

OTHER PUBLICATIONS

Archana Kumari, Sanat Kumar, “Pyrolytic degradation of polyethylene in autoclave under high pressure to obtain fuel”, Journal of Analytical and Applied Pyrolysis, vol. 124, 2017, pp. 298-302, ISSN 0165-2370, https://doi.org/10.1016/j.jaap.2017.01.020.*

* cited by examiner

INERT THERMAL DECOMPOSITION METHODS AND SYSTEMS

FIELD OF THE DISCLOSURE

This disclosure relates generally to waste decomposition, and more particularly to methods and systems for decomposing biomass materials and polymers in an efficient and environmentally safe manner to generate useful decomposition byproducts.

BACKGROUND

The handling of waste materials is an increasing concern for businesses and municipalities across the globe. Among some of the most costly and/or problematic waste materials are biomass waste materials and polymer-based materials and products. Biomass waste materials include biohazardous waste from human material specimens and pathological waste that is inclusive of body parts and whole cadavers. Biomass materials frequently carry diseases and/or viruses. Polymer materials (e.g., polyethylene, polystyrene, other plastics, etc.) comprise large molecules composed of repeating structural units called monomers that are covalently bonded to form long chains. Polymer materials do not readily break down on their own and may be toxic to humans and the environment. For example, at the current rate of at least 8 million tons of plastics being dumped into the oceans each year, there will be more plastic by weight than fish in the oceans by the year 2050. Furthermore, biomass waste materials are frequently placed in plastic bags prior to disposal thereby further complicating waste management. Thus, in general, it is clearly not desirable to simply dump biomass waste and/or polymer-based waste in landfills and oceans as this approach to waste disposal threatens the environment and subjects the general population to disease and toxicity.

SUMMARY

Accordingly, it is an object of the present disclosure to describe methods and systems that provide for the safe and efficient handling of biomass waste materials and/or polymer-based waste materials.

Another object of the present disclosure is to describe methods and systems for processing biomass waste materials and/or polymer-based waste materials to generate useful products in ways that are efficient, operationally safe, and an environmentally safe.

Other objects and advantages of the methods and systems described herein will become more obvious hereinafter in the specification and drawings.

In accordance with methods and systems described herein, a container is disposed in a containment environment filled with a first oxygen-free inert gas at a positive pressure that is greater than an ambient pressure of an environment surrounding the containment environment. The container has two ports and is partially filled with a material to be decomposed. The container is positioned to dispose the two ports above the material so that a free volume is defined between the two ports and the material. A second oxygen-free inert gas is circulated through the free volume via the two ports to remove moisture from the material wherein the second oxygen-free inert gas fills the free volume. The container with the second oxygen-free inert gas therein is heated to cause the material to undergo pyrolysis wherein the material decomposes into gaseous products, liquid products, and solid products. During pyrolysis heating, the gaseous products are removed via the two ports. The container is then cooled to reduce temperatures of the liquid products and the solid products below flash-point temperatures thereof.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

The present disclosure will describe methods and systems for the decomposition of waste materials to include biomass waste materials and polymer-based waste materials. Briefly, the methods and systems described herein provide for the efficient, operationally-safe, and environmentally-safe decomposition of the waste materials. In some embodiments, the methods and systems may provide for the use and/or storage of the byproducts produced by the decomposition methods and systems.

Figure 1A:
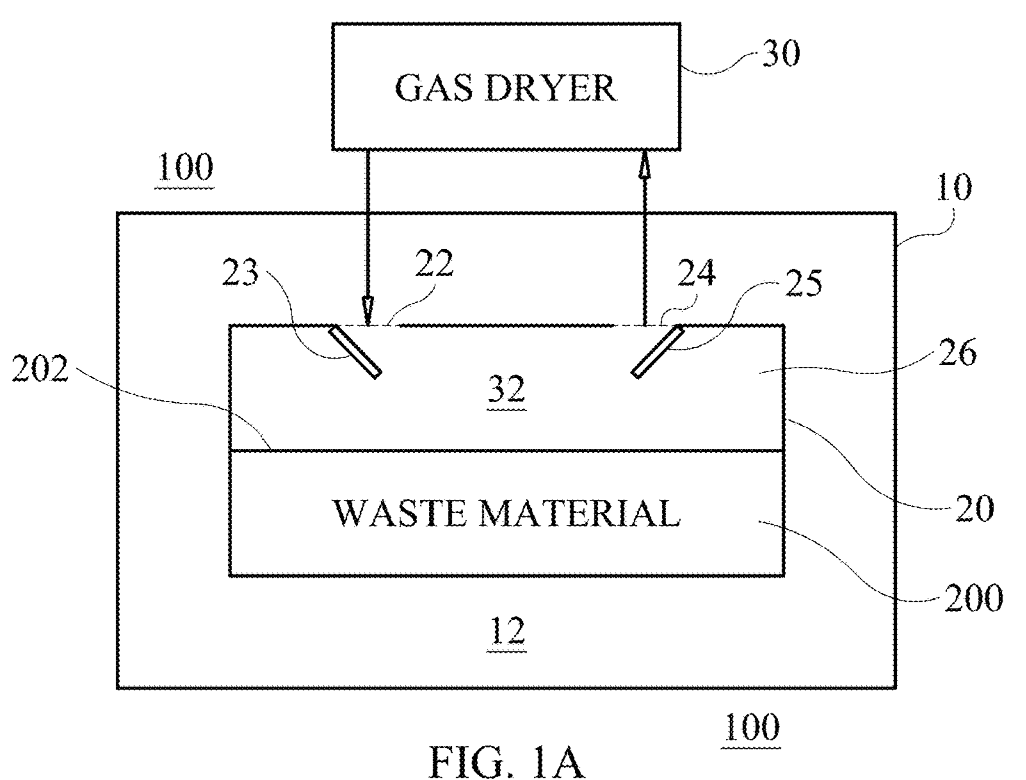
FIG. 1A is a schematic view of a containment environment and a container partially filled with waste material during initial processing steps of an embodiment of an inert thermal decomposition method and system in accordance with various aspects as described herein.
Figure 1B:
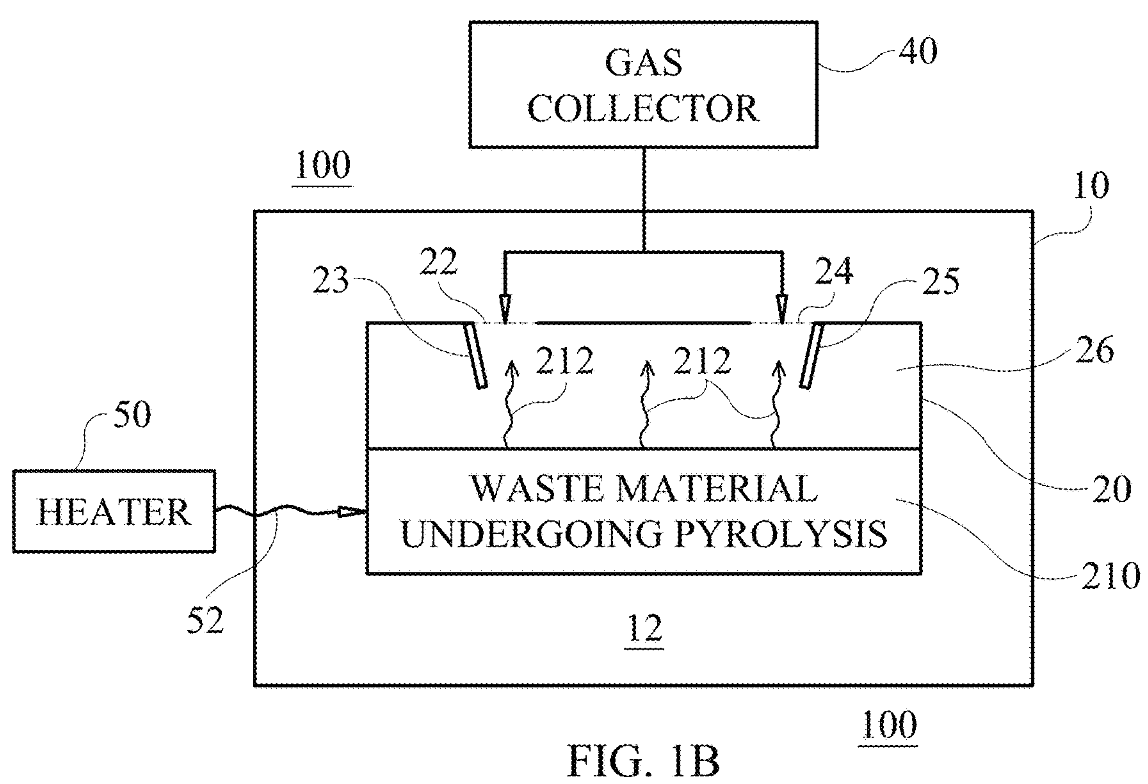
FIG. 1B is a schematic view of the containment environment and the container partially filled with waste material during intermediate processing steps of an embodiment of an inert thermal decomposition method and system in accordance with various aspects as described herein.
Figures 1C, 2:
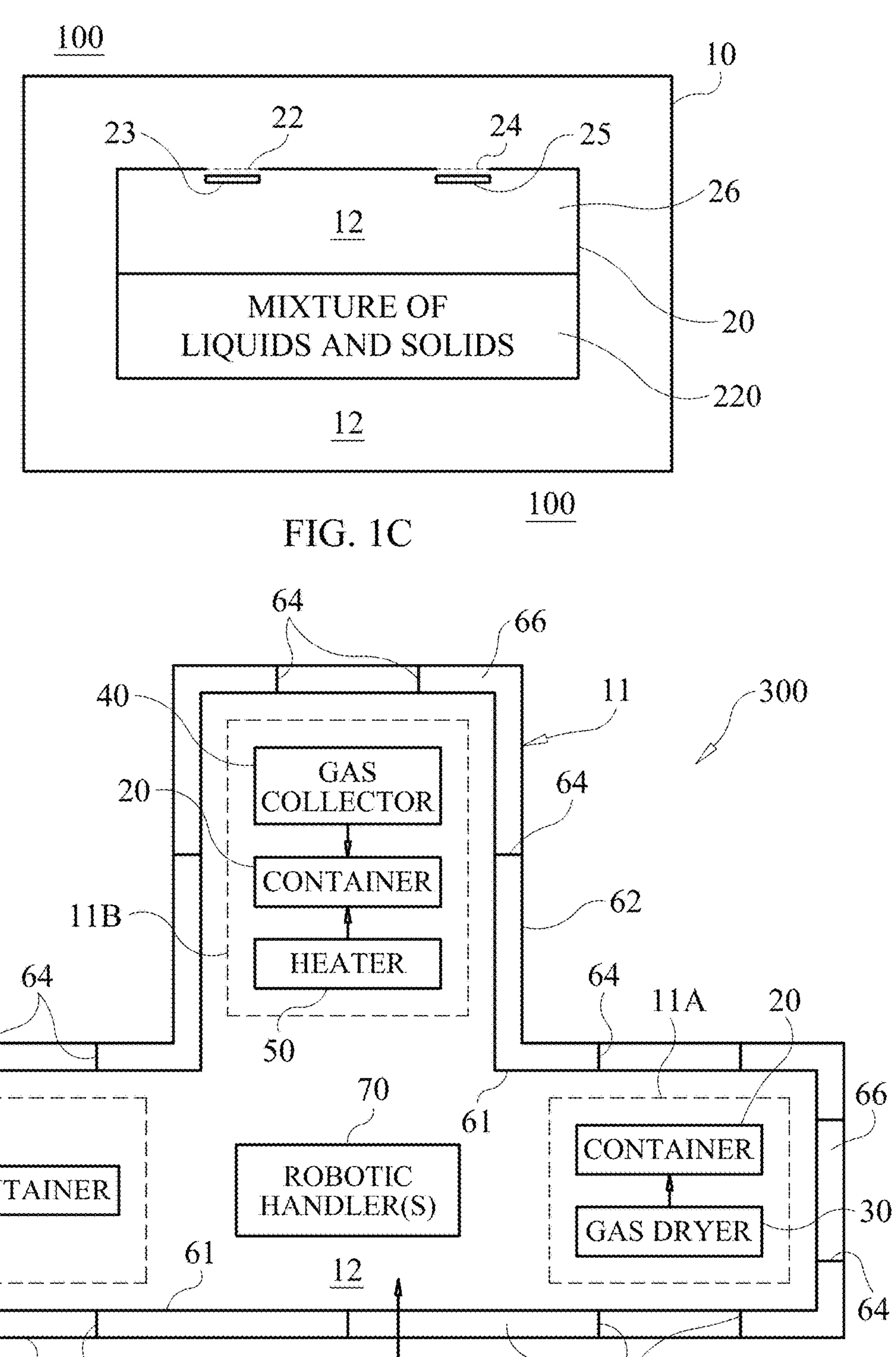
FIG. 1C is a schematic view of the containment environment and the container partially filled with liquid and solid byproducts during final processing steps of an embodiment of an inert thermal decomposition method and system in accordance with various aspects as described herein.
FIG. 2 illustrates one embodiment of an inert thermal decomposition system in accordance with various aspects as described herein.

Referring now to the drawings and more particularly to FIGS. 1A-1C, a series of schematic views are shown of a containment environment and a container disposed therein to illustrate inert decomposition processing in accordance with an embodiment of the present disclosure. Throughout the processing illustrated in FIGS. 1A-1C, the containment environment is referenced by numeral 10 and the container is referenced by numeral 20. In general, containment environment 10 is a sealed or sealable oxygen-free environment that is filled with an inert gas (e.g., argon or other noble gas, nitrogen, etc.) indicated by reference numeral 12. Inert gas 12 is at a positive pressure as compared to the environment 100 surrounding containment environment 10. In some embodiments, a positive pressure in a range of approximately 5-10 pounds per square inch ("psi") may be sufficient to maintain inert gas 12 at a higher pressure than that of surrounding environment 100 that typically will be an ambient air environment having some percentage of oxygen included therewith.

In general, container 20 is a rigid container that is partially filled with a waste material 200. While a variety of waste materials may be processed in accordance with the present disclosure, it will be assumed herein that waste material 200 is biomass waste material and/or polymer-based waste material. The way that container 20 is configured to receive waste material 200 is not a limitation of the present disclosure. Materials used for container 20 should be capable of withstanding temperatures required for the decomposition process that will be described later below. Suitable rigid materials include a variety of stainless steels such as Type 304 stainless steel.

Container 20 includes two ports 22 and 24 that may be configured in a variety of ways without departing from the scope of the present disclosure. In some embodiments, ports 22 and 24 are configured to automatically seal when not pierced or engaged as will be described further below. For example, each of ports 22 and 24 may be sealable by a respective flap 23 and 25 biased to seal their respective port unless pierced/engaged to thereby seal container 20.

As shown in FIG. 1A, container 20 is positioned in containment environment 10 such that both ports are above waste material 200 so that a free volume 26 is defined between ports 22 and 24 and the top surface 202 of waste material 200. With container 20 so-disposed in containment environment 10, a gas dryer 30 is coupled to and engages ports 22/24 to circulate an inert drying gas 32 through free volume 26. Gas dryer 30 may be configured to cause inert drying gas 32 to flow into port 22 and then out of port 24 (as shown) or vice versa without departing form the scope of the present disclosure. Gas dryer 30 may include a moisture absorber (e.g., desiccant) to dry gas 32 returning from free volume 26. Gas dryer 30 may be located outside of containment environment 10 (as shown) or inside containment environment 10 without departing from the scope of the present disclosure. Inert drying gas 32 may be same gas used for inert gas 12 or may be different than inert gas 12 without departing from the scope of the present disclosure. A flow of drying gas 32 through free volume 26 is maintained until sufficient moisture is removed from waste material 200 as indicated, for example, by the moisture content of gas 32 returning to gas dryer 30 as measured by one or more sensors (not shown). Once the moisture content of gas 32 has fallen below a desired percentage, the moisture reduction processing is complete.

The next or intermediate processing of the disclosed inert decomposition will be explained with reference to FIG. 1B. Ports 22 and 24 are accessed/engaged by a gas collector 40, while a heater 50 is used to heat (as indicated by wavy-line arrow 52) container 20 and the contained waste material. Briefly, heat 52 is applied to raise the temperature of the waste material to undergo pyrolysis as indicated by reference numeral 210 whereby the waste material breaks down into gaseous products, liquid products, and solid products. The gaseous products are indicated in FIG. 1B by wavy-line arrows referenced by numeral 212. Gaseous products 212 are collected from free volume 26 by gas collector 40 via ports 22 and 24. Gas collector 40 may include a vacuum as well as gas storage container(s). Gas collector 40 may be located outside of containment environment 10 (as shown) or inside containment environment 10 without departing from the scope of the present disclosure.

The temperature of heat 52 and duration of its application are dependent on the type and amount of waste material undergoing pyrolysis (indicated by numeral 210) and the desired pyrolysis byproducts. For many waste materials, heat 52 may be such that the temperature of the material 210 undergoing pyrolysis is raised to a temperature in a range of 350-500° C. and may be applied for 2-3 hours. However, it is to be understood that the particular pyrolysis temperatures and duration of such heating may be different without departing from the scope of the present disclosure. The monitoring of the temperature of material 210 undergoing pyrolysis may be achieved in a variety of ways without departing form the scope of the present disclosure. In general, lower temperatures will produce more liquids, while higher temperatures will produce more gases and solids. When there are no more gaseous products 212 being produced, the processing illustrated in FIG. 1B is considered complete. After gas collector 40 is disconnected from container 20, free volume 26 is allowed to fill with inert gas 12, and ports 22 and 24 are resealed such that container 20 is partially filled with a mixture of liquids and solids as indicated by reference numeral 220, while free volume 26 is filled with inert gas 12 as illustrated in FIG. 1C.

The next or final processing of the disclosed inert decomposition will be explained with reference to FIG. 1C. Ports 22 and 24 are sealed (e.g., by flaps 23 and 25 in the illustrated example) and container 20 is partially filled with a mixture 220 of liquids and solids decomposed from the original waste material 200 (FIG. 1A) during the pyrolysis processing described above. Container 20 and mixture 220 are cooled in containment environment 10. Such cooling may occur passively or actively without departing from the scope of the present disclosure. Since containment environment 10 is filled with inert gas 12 at a positive pressure, free volume 26 remains oxygen-free when collection of gas products 212 (FIG. 1B) is complete and cooling commences and progresses as shown in FIG. 1C.

Cooling of mixture 220 proceeds until the temperature of mixture 220 is reduced to a temperature that is below the flash point (i.e., temperature at which combustion occurs in the presence of oxygen) of the liquids and solids in mixture 220. Cooling times may be determined empirically and/or using temperature sensors (not shown) disposed within container 20.

As mentioned above, the products produced by the described inert decomposition include gaseous products, liquid products, and solid products. When starting with waste material that is biomass material and/or polymer-based material, the gas products include biogas (e.g., primarily methane and carbon dioxide), the liquid products include bio-oil (e.g., a variety of oils some of which may be used as a fuel), and the solid products include biochar (e.g., carbon black). In general, greater amounts of biochar are produced from biomass materials, while greater amounts of bio-oil are produced from polymer materials.

Referring now to FIG. 2, an embodiment of an inert decomposition system is shown and is referenced generally by numeral 300. Elements of system 300 described previously herein are indicated by the same reference numerals and will not be described further. In system 300, a single containment environment 11 is used to support all the above-described inert decomposition processing shown in FIGS. 1A-1C. That is, once a container 20 is placed in containment environment 11, it remains in containment environment 11 until all the above-described stages of inert decomposition are complete. In some embodiments, one or more containers may be processed in each stage within containment environment 11 to maintain a desired throughput. The respective loading and unloading of each container 20 into and out of containment environment 11 may be handled in a variety of manual, mechanical, and/or automated ways without departing from the scope of the present disclosure. For clarity of illustration, the above-described details of each container 20 and its waste material contents have been omitted from FIG. 2, while gas dryer 30, gas collector 40, and heater 50 are illustrated in containment environment 11.

Containment environment 11 may be constructed as a sealed or sealable structure. For example, containment environment 11 may be a double-wall structure having an inner wall 61 and an outer wall 62 spaced apart from inner wall 61 such that a spatial volume 66 is defined there between. Spacers/supports 64 may be used to couple walls 61 and 62 to one another. One or more gateways (not shown) may be incorporated into the double-wall structure to provide for the insertion and removal of containers.

In some embodiments, spatial volume 66 is maintained at a pressure that is less than the pressure of the surrounding environment 100. Accordingly, the pressure of spatial volume 66 will be referred to herein as a negative pressure as compared to the pressure of surrounding environment 100. A negative pressure source 68 may be used to create and/or maintain the negative pressure within spatial volume 66. The use of a double-wall containment environment 11 whose spatial volume 66 is maintained at negative pressure throughout the inert decomposition processing assures that inert gases within containment environment 11 are prevented from escaping into the surrounding environment 100, while oxygen present in surrounding environment 100 is prevented from entering containment environment 11.

In some embodiments, containment environment 11 is configured to support a first stage area designated by dashed-line box 11A, a second stage area designated by dashed line box 11B, and a third stage area designated by dashed-line box 11C. Stage area 11A may support the processing shown in FIG. 1A, stage area 11B may support the processing shown in FIG. 1B, and stage area 11C may support the processing shown in FIG. 1C. In some embodiments, robotic handler(s) 70 may be provided in containment environment 11 to manipulate and move containers 20 into and out of the stage areas. In some embodiments, a pressure source 72 may be provided to supply and maintain inert gas 12 at a positive pressure within containment environment 11.

Figure 3:
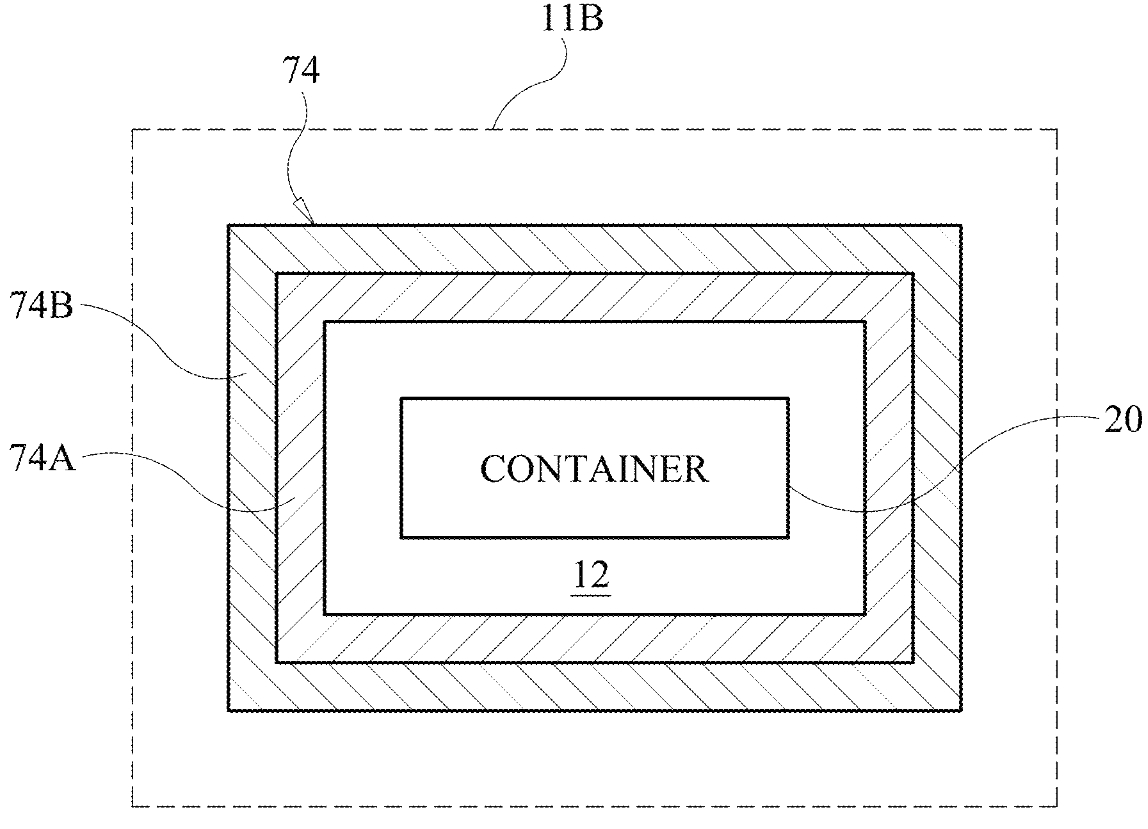
FIG. 3 is an isolated cross-sectional schematic view of one embodiment of a heating chamber that may be disposed in an inert thermal decomposition system in accordance with various aspects as described herein.

In some embodiments, stage area 11B may include a heating chamber (not shown in FIG. 2) to contain the heat energy used to heat container 20 and its contents in stage area 11B. For example and is illustrated in isolation in FIG. 3, stage area 11B may include a heating chamber 74 that encases container 20 during processing in stage area 11B when pyrolysis takes place as described earlier herein. Heating chamber 74 may include an inner wall 74A constructed from fire bricks and an outer wall 74B constructed from an aerogel. Heating chamber 74 may be constructed to support the insertion and removal of a container 20 in a variety of ways without departing from the scope of the present disclosure. Heating chamber 74 may also be constructed to provide for the circulation of an inert gas (e.g., inert gas 12) about container 20 when it is installed in heating chamber 74.

Figure 4:
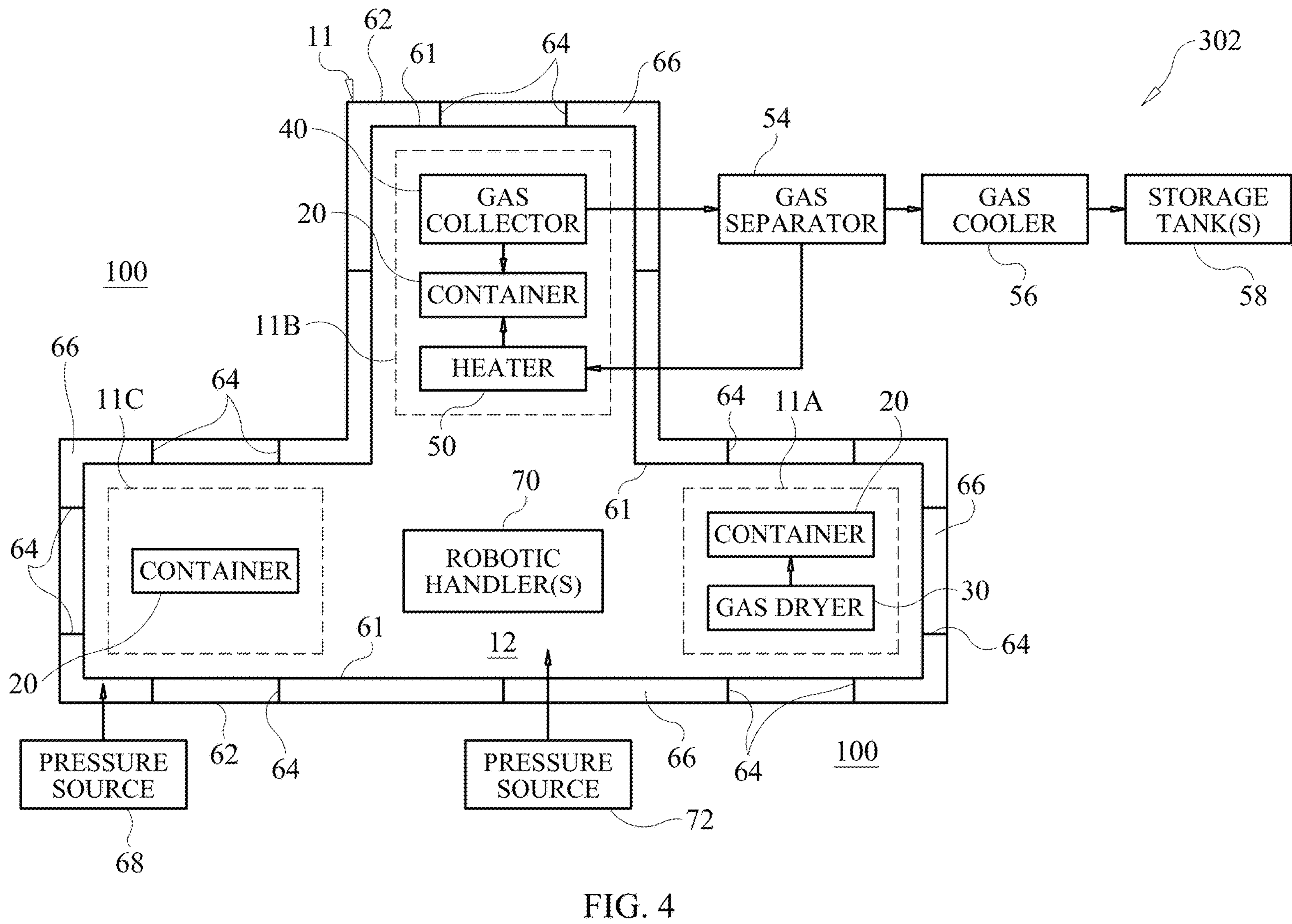
FIG. 4 illustrates another embodiment of an inert thermal decomposition system in accordance with various aspects as described herein.

In some embodiments, some of the gaseous products produced during the pyrolysis occurring in stage area 11B may be stored and some of the gaseous products may be used as a combustible (fuel) gas usable by heater 50. Accordingly, FIG. 4 illustrates another embodiment of an inert decomposition system 302 where the gaseous products collected during pyrolysis (e.g., gaseous products 212 shown in FIG. 1B) are passed through a gas separator 54. Gaseous products suitable for use as fuel for heater 50 are separated and passed to heater 50, while other gaseous products may be cooled as they pass through a cooler 56 prior to being stored in storage tank(s) 58.

Figure 5:
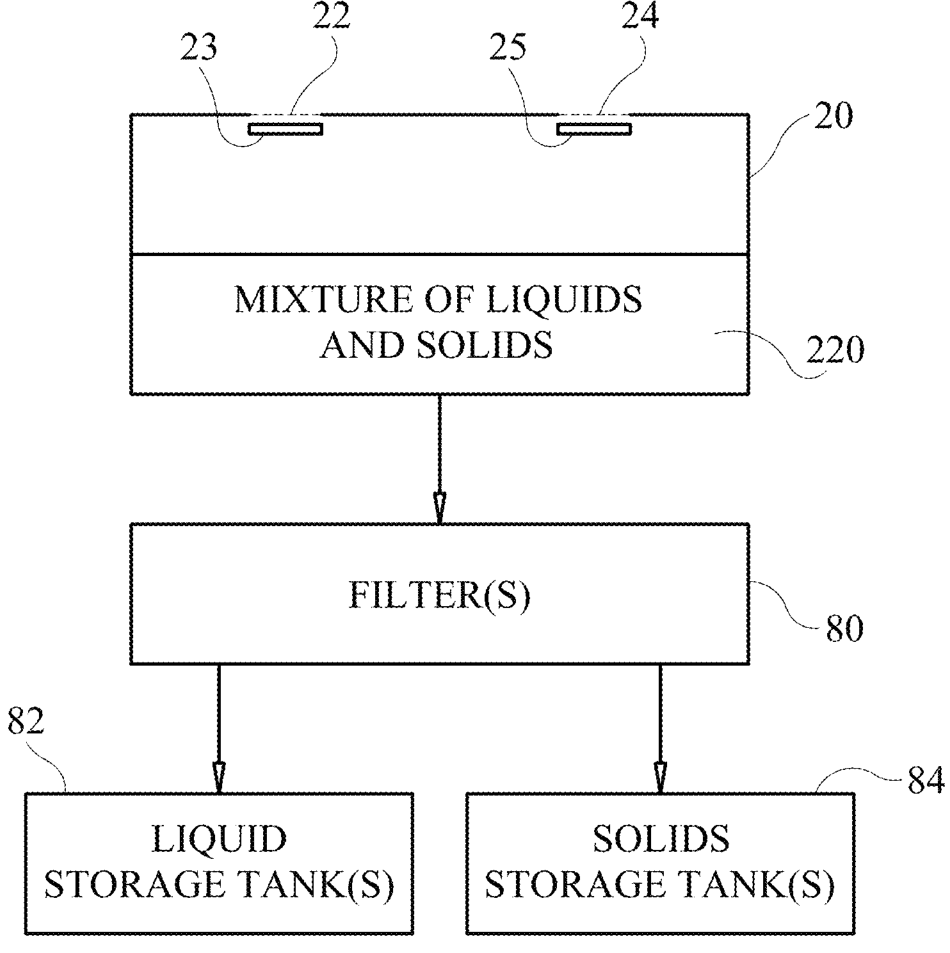
FIG. 5 is a schematic view of an embodiment of a method for post-processing of the liquid and solid byproducts generated by inert thermal decomposition methods and systems in accordance with various aspects as described herein.

Once a container 20 has completed all inert decomposition processing stages, the container may be removed from containment area 11. In some embodiments, the cooled mixture of liquids and solids (e.g., mixture 220 shown in FIG. 1C) may undergo post-processing as illustrated in FIG. 5. Briefly, cooled mixture 220 is removed from a container 20 and is then processed through one or more filter(s) 80. Filtered-out liquids may be stored in one or more liquid storage tank(s) 82, while filtered-out solids may be stored in one or more solids storage tank(s) 84.

The advantages of the methods and systems described herein are numerous. The use of inert gas(es) in a pressure-controlled containment environment during all stages of decomposition provides an efficient, operationally-safe, and environmentally-safe way to decompose biomass waste materials and/or polymer waste materials. Some of the decomposed products may be useful to support the decomposition processing, while other decomposed products may be recycled for use in other commercial settings.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

The invention claimed is:

1. A method, comprising:

providing a container in a containment environment, wherein the containment environment is filled with a first oxygen-free inert gas at a positive pressure that is greater than an ambient pressure of an environment surrounding the containment environment, and wherein the container has two ports and is partially filled with a material to be decomposed, positioning the container to dispose the two ports above the material wherein a free volume is defined between the two ports and the material;

circulating a second oxygen-free inert gas through the free volume via the two ports to remove moisture from the material wherein the second oxygen-free inert gas fills the free volume;

heating the container with the second oxygen-free inert gas filling the free volume to cause the material to undergo pyrolysis, wherein the material decomposes into gaseous products, liquid products, and solid products;

removing, via the two ports, the gaseous products during the step of heating; and cooling the container to reduce temperatures of the liquid products and the solid products below flash-point temperatures thereof.

2. The method of claim 1, wherein the first oxygen-free inert gas and the second oxygen-free inert gas are the same gas.

3. The method of claim 1, wherein the material includes biomass materials, and wherein the gaseous products include biogases, the liquid products include bio-oil, and the solid products include biochar.

4. The method of claim 1, wherein the material includes polymers, and wherein the gaseous products include biogases, the liquid products include bio-oil, and the solid products include biochar.

5. The method of claim 1, wherein the gaseous products comprise a combustible gas.

6. The method of claim 1, wherein a perimeter wall of the containment environment comprises a first wall spaced apart from a second wall to define a spatial volume between the first wall and the second wall, the method further comprising maintaining the spatial volume at a negative pressure that is less than the ambient pressure of the environment surrounding the containment environment.

7. The method of claim 1, wherein the step of heating further comprises:

encasing the container in a chamber having an inner wall surrounded by an outer wall, the inner wall comprising fire bricks and the outer wall comprising an aerogel; and circulating the first oxygen-free inert gas about the container in the chamber.

8. A method, comprising:

providing a container having two ports and partially filled with a material to be decomposed, filling a containment environment with a first oxygen-free inert gas at a positive pressure that is greater than an ambient pressure of an environment surrounding the containment environment;

positioning the container in the containment environment to dispose the two ports above the material wherein a free volume is defined between the two ports and the material;

circulating, while the container is in the containment environment, a second oxygen-free inert gas through the free volume via the two ports to remove moisture from the material wherein the second oxygen-free inert gas fills the free volume;

heating the container in the containment environment with the second oxygen-free inert gas filling the free volume to subject the material to pyrolysis, wherein the material decomposes into gaseous products, liquid products, and solid products;

removing, via the two ports, the gaseous products during the step of heating; and cooling the container in the containment environment to reduce temperatures of the liquid products and the solid products below flash-point temperatures thereof.

9. The method of claim 8, wherein the first oxygen-free inert gas and the second oxygen-free inert gas are the same gas.

10. The method of claim 8, wherein the material includes biomass materials, and wherein the gaseous products include biogases, the liquid products include bio-oil, and the solid products include biochar.

11. The method of claim 8, wherein the material includes polymers, and wherein the gaseous products include biogases, the liquid products include bio-oil, and the solid products include biochar.

12. The method of claim 8, wherein the gaseous products comprise a combustible gas.

13. The method of claim 8, wherein a perimeter wall of the containment environment comprises a first wall spaced apart from a second wall to define a spatial volume between the first wall and the second wall, the method further comprising maintaining the spatial volume at a negative pressure that is less than the ambient pressure of the environment surrounding the containment environment.

14. The method of claim 8, wherein the step of heating further comprises:

encasing the container in a chamber having an inner wall surrounded by an outer wall, the inner wall comprising fire bricks and the outer wall comprising an aerogel; and circulating the first oxygen-free inert gas about the container in the chamber.

* * * * *